US009369277B2

(12) United States Patent
Augustine et al.

(10) Patent No.: US 9,369,277 B2
(45) Date of Patent: Jun. 14, 2016

(54) ENCRYPTION CODE GENERATION USING SPIN-TORQUE NANO-OSCILLATORS

(71) Applicant: INTEL CORPORATION, Santa Clara, CA (US)

(72) Inventors: Charles Augustine, Portland, OR (US); Carlos Tokunaga, Hillsboro, OR (US); James W. Tschanz, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 42 days.

(21) Appl. No.: 14/325,844

(22) Filed: Jul. 8, 2014

(65) Prior Publication Data

US 2016/0013940 A1     Jan. 14, 2016

(51) Int. Cl.
*H04L 9/00* (2006.01)
*H04L 9/08* (2006.01)

(52) U.S. Cl.
CPC ............ *H04L 9/0877* (2013.01); *H04L 9/0816* (2013.01); *H04L 2209/12* (2013.01); *H04L 2209/24* (2013.01)

(58) Field of Classification Search
CPC .................................................... H04L 9/0877
USPC ............................................................ 380/44
See application file for complete search history.

(56) References Cited

U.S. PATENT DOCUMENTS

| 8,854,871 | B1 * | 10/2014 | Jain .................... G11C 11/5607 365/158 |
| 8,925,098 | B2 | 12/2014 | Hyde et al. |
| 9,110,771 | B2 * | 8/2015 | Hoppensteadt ......... G06F 15/00 |
| 2004/0052374 | A1 | 3/2004 | Lee et al. |
| 2014/0176203 | A1 | 6/2014 | Matheny et al. |

FOREIGN PATENT DOCUMENTS

TW     201349743 A     12/2013

OTHER PUBLICATIONS

J. W. Lee, D. Lim, B. Gassend, E. G. Suh, M. van Dijk,and S. Devadas, "Building a secret key in integrated circuits for identification and authentication applications", Proc. Symp. VLSI Circuits, pp. 1176-179, 2004.
D. Lim, "Extracting Secret Keys from Integrated Circuits." Master's thesis, MIT, MA, USA, 2004.
Lofstrom, K., Daasch, W.R., Taylor, D.: IC Identification Circuit Using Device Mismatch. In: Proceedings of ISSCC 2000, pp. 372-373 (Feb. 2000).

(Continued)

*Primary Examiner* — Dant Shaifer Harriman
(74) *Attorney, Agent, or Firm* — Schwabe, Williamson & Wyatt, P.C.

(57) ABSTRACT

Embodiments include apparatuses, methods, and systems for generation of an encryption key. In various embodiments, an authentication circuit may include a first bank of spin-torque nano-oscillators (STNOs) including a plurality of STNOs to generate respective oscillation signals and a second bank of STNOs including a plurality of STNOs to generate respective oscillation signals. The authentication circuit may further include a key generation circuit to select a first oscillation signal from the plurality of oscillation signals associated with the first bank of STNOs and a second oscillation signal from the plurality of oscillation signals associated with the second bank of STNOs. The key generation circuit may generate an encryption key based on a frequency of the first oscillation signal and a frequency of the second oscillation signal.

23 Claims, 5 Drawing Sheets

(56) References Cited

OTHER PUBLICATIONS

F. Armknecht, R. Maes, A.-R. Sadeghi, B. Sunar, and P.T uyls, "Memory leakage-resilient encryption based on physically unclonable functions," in Advances in Cryptology (ASIACRYPT), ser. LNCS, vol. 5912, 2009, pp. 685-702.

B. Gassend, D. Clarke, M. van Dijk, S. Devadas, "In Controlled Physical Random Functions." ACSAC '02: Proceedings of the 18th Annual Computer Security Applications Conference (IEEE Computer Society, Washington, DC, 2002), p. 149.

Zeng, G. Finocchio, B. Zhang, P.K. Amiri, J.A. Katine, I.N. Krivorotov, Y. Huai, J. Langer, B. Azzerboni, K.L.Wang,and H.Jiang, "Ultra low-current-density and bias-field-freespin-transfer nano-oscillator," Sci. Rep., vol. 3, pp. 1-5, Mar. 2013.

P. Villard, U. Ebels, D. Houssameddine, J. Katine, D. Mauri, B. Delaet, P. Vincent, M.-C.Cyrille, B. Viala, J.-P. Michel, J. Prouv and F. Badets, "A GHz spintronic-based RF oscillator", IEEE J. Solid-State Circuits, vol. 45, No. 1,pp. 214-223, 2010.

S. Yuasa, A. Fukushima, K. Yakushiji, T. Nozaki, M. Konoto, H. Maehara, H. Kubota, T. Taniguchi, H. Imamura, K. Ando, Y. Shiota, F. Bonell, Y. Suzuki, "Future Prospects of MRAM Technologies", International Electron Device Meeting, 2013.

Office Action and Search Report mailed Apr. 12, 2016 for Taiwan Patent Application No. 104117770, 5 pages.

\* cited by examiner

ENCRYPTION CODE GENERATION USING SPIN-TORQUE NANO-OSCILLATORS

FIELD

Embodiments of the present invention relate generally to the technical field of electronic circuits, and more particularly to encryption code generation using spin-torque nano-oscillators.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

Many electronic circuits, such as computer chips, use encryption keys to authenticate with another device. Some circuits use a physically unclonable function (PUF) circuit to generate an encryption key. The PUF circuit exploits physical variation due to manufacturing to generate a unique encryption key. However, current PUF circuits have a significant false rejection rate and false acceptance rate.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

In the following detailed description, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. As used herein, "computer-implemented method" may refer to any method executed by one or more processors, a computer system having one or more processors, a mobile device such as a smartphone (which may include one or more processors), a tablet, a laptop computer, a set-top box, a gaming console, and so forth.

Figure 1:
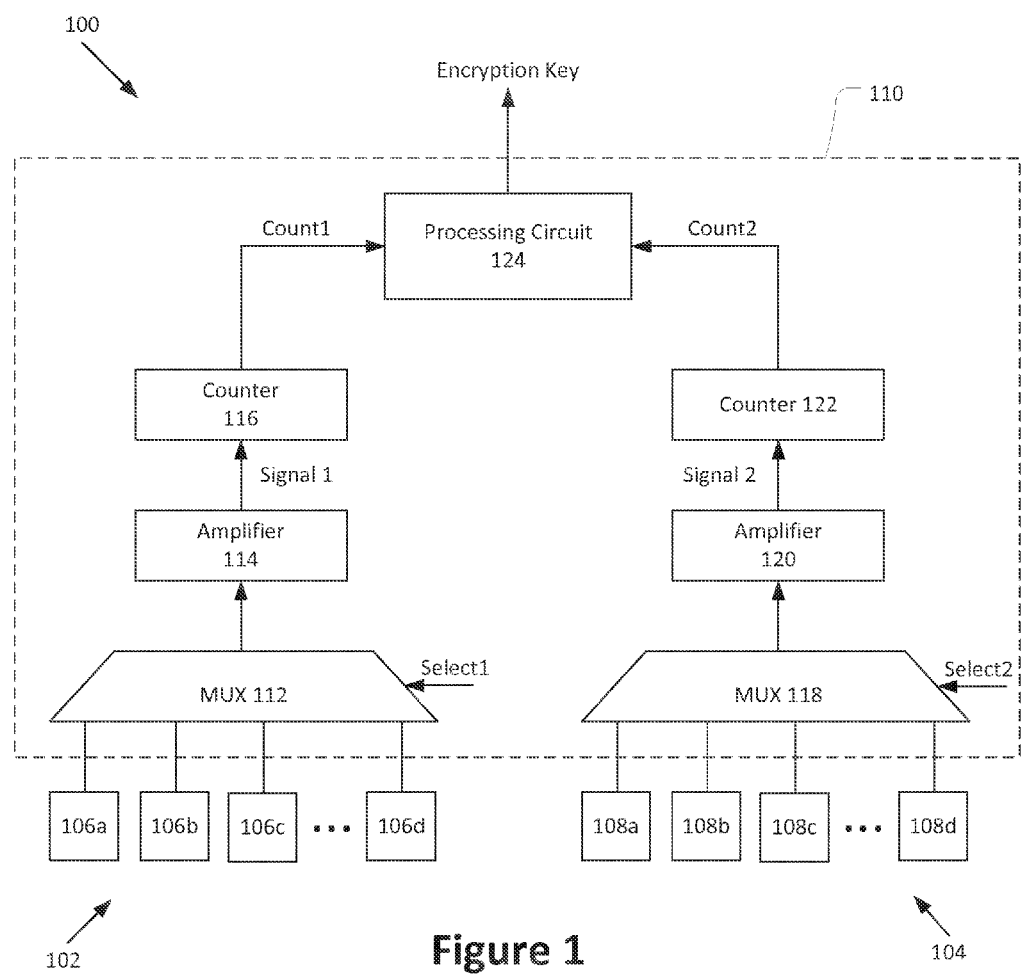
FIG. 1 schematically illustrates an authentication circuit in accordance with various embodiments.

FIG. 1 schematically illustrates an authentication circuit 100 (also referred to as "circuit 100") in accordance with various embodiments. The circuit 100 may include a first bank of spin-torque nano-oscillators (STNOs) 102 (also referred to as the first bank 102) and a second bank of STNOs 104 (also referred to as the second bank 104). The first bank of STNOs 102 may include a plurality of STNOs 106*a-d*, and the second bank of STNOs 104 may include a plurality of STNOs 108*a-d*. The circuit 100 may further include a key generation circuit 110 coupled to the first bank of STNOs 102 and the second bank of STNOs 104.

The key generation circuit 110 may include a first multiplexer 112 coupled to the STNOs 106*a-d* of the first bank 102, a first amplifier 114 coupled to the first multiplexer 112, and/or a first counter 116 coupled to the first amplifier 114. The key generation circuit 110 may further include a second multiplexer 118 coupled to the STNOs 108*a-d* of the second bank 104, a second amplifier 120 coupled to the second multiplexer 118, and a second counter 122 coupled to the second amplifier 120. Additionally, the key generation circuit 110 may include a processing circuit 124 coupled to the first counter 116 and the second counter 122.

The STNOs 106*a-d* and/or 108*a-d* may be memory cells of a memory (e.g., a spin-torque transfer random access memory (STT-RAM). The STNOs 106*a-d* may include magnetic tunnel junctions (MTJs) to store data. Although the first bank of STNOs 102 and the second bank of STNOs 104 are shown to include separate STNOs 106*a-d* and STNOs 108*a-d*, respectively, in some embodiments the first bank 102 and second bank 104 may share some or all of the STNOs 106*a-d* and/or 108*a-d* (e.g., one or more STNOs may be included in the first bank 102 and the second bank 104). The first bank 102 may include any suitable number of STNOs 106*a-d* and the second bank 104 may include any suitable number of STNOs 108*a-d*.

Figure 2:
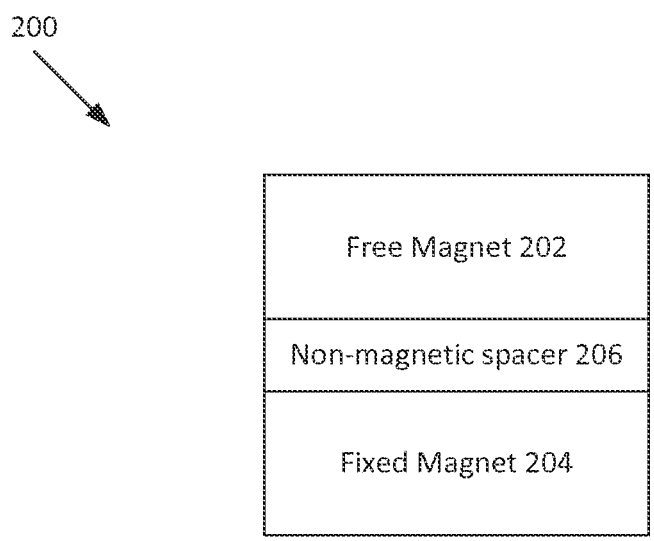
FIG. 2 schematically illustrates a spin-torque nano-oscillator (STNO) in accordance with various embodiments.

FIG. 2 illustrates an STNO in accordance with various embodiments. The STNO 200 may be included in the STNOs 106*a-d* and/or the STNOs 108*a-d*. The STNO 200 may include a free magnet 202 and a fixed magnet 204. The STNO 200 may further include a non-magnetic spacer 206 disposed between the free magnet 202 and the fixed magnet 204. The non-magnetic spacer 206 may include, for example magnesium oxide (MgO). In various embodiments, the free magnet 202, fixed magnet 204, and non-magnetic spacer 206 may form a magnetic tunnel junction (MTJ).

The MTJ may store data according to an orientation of the free magnet 202. For example, the free magnet 202 may be set to be in a parallel state with the fixed magnet 204 to store a first logic value (e.g., a logic 1) or an anti-parallel state with the fixed magnet 204 to store a second logic value (e.g., a logic 0). The MTJ may have significantly higher resistance in the anti-parallel state than in the parallel state.

In various embodiments, the free magnet 202 may oscillate when a direct current (DC) current is applied to the STNO 200. The oscillation of the free magnet 202 may cause the STNO 200 to generate a periodic oscillation signal with an associated frequency. In various embodiments, the frequency of the oscillation signal may vary depending on the thickness of the non-magnetic spacer 206.

For example, the damping torque, D, in the free magnet 202 may be given by Equation (1):

$$D = \alpha \hat{m} \times \frac{d\hat{m}}{dt}$$

where m is the magnetization of the free layer and a is the damping factor. Additionally, the spin-torque term T of the free magnet 202 may be given by Equation (2):

$$T = \frac{1}{qNS} \hat{m} \times \hat{m} \times ISPIN$$

where q is the electron charge, NS is the number of spins in the free magnet and ISPIN is the spin-current generated by the DC current applied to the MTJ. With sufficient ISPIN, the damping torque may be balanced, resulting in oscillations in the magnetization vector m, which is constant in magnitude and in frequency.

In various embodiments, the resistance of the MTJ is exponentially dependent on the thickness of the non-magnetic spacer 206. Accordingly, manufacturing variations that cause variation in the thickness of the non-magnetic spacer 206 may result in significant variation in the resistance of the MTJ. The variation in the resistance of the MTJ may result in corresponding variation in the ISPIN, which in turn results in corresponding variation in the frequency of the oscillation signal generated by the STNO 200.

In various embodiments, the variation in the frequency of the oscillation signal generated by the STNO 200 may be exploited by the circuit 100 to generate an encryption key. For example, the plurality of STNOs 106a-d of the first bank 102 may generate respective oscillation signals, and the plurality of STNOs 108a-d of the second bank 104 may generate respective oscillation signals. A DC current may be provided to the STNOs 106a-d and/or STNOs 108a-d to facilitate generation of the respective oscillation signals.

In various embodiments, the first multiplexer 112 may select a first oscillation signal (e.g., Signal1) from the plurality of oscillation signals associated with the first bank 102. The first oscillation signal may be generated by one of the plurality of STNOs 106a-d. The first multiplexer 112 may select the first oscillation signal based on a first select signal (e.g., Select1).

Additionally, the second multiplexer 118 may select a second oscillation signal (e.g., Signal2) from the plurality of oscillation signals associated with the second bank 104. The second oscillation signal may be generated by one of the plurality of STNOs 108a-d. The multiplexer 118 may select the second oscillation signal based on a second select signal (e.g., Select2).

In various embodiments, the key generation circuit 110 may generate an encryption key based on a frequency of the first oscillation signal and a frequency of the second oscillation signal. For example, as shown in FIG. 1, the first multiplexer 112 may pass the first oscillation signal to the first amplifier 114. The first amplifier 114 may process the first oscillation signal and pass the first oscillation signal to the first counter 116.

In various embodiments, the first counter 116 may count transitions of the first oscillation signal for a pre-defined time period to obtain a first count value (e.g., Count1). The transitions may include rising edges and/or falling edges (e.g., rising edges only, falling edges only, or both rising edges and falling edges) of the first oscillation signal. Accordingly, the first count value may correspond to the frequency of the first oscillation signal.

In various embodiments, the second multiplexer 118 may pass the second oscillation signal to the second amplifier 120. The second amplifier 120 may process the second oscillation signal and pass the second oscillation signal to the second counter 122.

In various embodiments, the second counter 122 may count transitions of the second oscillation signal for the pre-defined time period to obtain a second count value (e.g., Count2). The transitions may include rising edges and/or falling edges (e.g., rising edges only, falling edges only, or both rising edges and falling edges) of the second oscillation signal. Accordingly, the second count value may correspond to the frequency of the second oscillation signal.

In various embodiments, the processing circuit 124 may receive the first and second count values, and may generate the encryption code based on the first and second count values. For example, the processing circuit 124 may include a comparator to compare the first count value with the second count value, and the processing circuit 124 may generate the encryption key based on the comparison.

In some embodiments, the processing circuit 124 may generate a single bit of the encryption key, wherein the single bit has a first value (e.g., a logic 1) if the first count value is greater than the second count value and a second value (e.g., a logic 0) if the first count value is less than (or less than or equal to) the second count value.

The key generation circuit 110 change the values of the first select signal and the second select signal to select different oscillation signals from the first bank 102 and second bank 104, respectively, and generate another bit of the encryption key using the changed values of the first and second select signals. Accordingly, the key generation circuit 110 may generate an encryption key that includes a plurality of bits, wherein the individual bits correspond to a given value of the first select signal and a given value of the second select signal. The key generation circuit 110 may use a pre-defined sequence of values for the first and second select signals to generate the encryption key. Accordingly, the encryption key may be associated with the pre-defined sequence of values for the first and second select signals.

In some embodiments, a plurality of pre-defined sequences of values for the first and second select signals may be defined to generate respective encryption keys. An authenticating device (e.g., an authentication server) may provide information to the circuit 100 to indicate the pre-defined sequence of values for the first and second select signals that the circuit 100 is to use to generate the encryption key.

Since the frequencies of the first and second oscillation signals will vary depending on manufacturing variation (e.g., variation in the thickness of the non-magnetic layer 206), the values of the bits of the encryption key will be dependent on the two oscillation signals (e.g., from one STNO 106a-d and one STNO 108a-d) selected. Additionally, the exponential dependence of the resistance of the STNO on the thickness of the non-magnetic layer may provide a large variation in oscillation frequencies among the STNOs 106a-d and 108a-d, thereby providing high variation in the encryption keys generated by different circuits 100. Accordingly, the encryption key may be a physically unclonable function (PUF) encryption key. Furthermore, the relative frequencies of the oscillation signals generated by the STNOs 106a-d and 108a-d may be consistent over time, thereby providing repeatable results. For example, the same encryption key will be generated when the same sequence of values is used for the first and second select signals. Accordingly, the circuit 100 may provide a low false rejection rate and a low false acceptance rate associated with the encryption key.

In other embodiments, the processing circuit 124 may generate a plurality of bits of the encryption key based on the comparison between the first count value and the second count value. For example, the processing circuit 124 may generate a plurality of bits that have values based on a magnitude of the difference between the first count value and the second count value. In some embodiments, one or more least significant bits (LSBs) of the generated plurality of bits may be overwritten or discarded to generate the encryption key. Overwriting or discarding one or more of the LSBs may account for noise in the oscillation signals and/or counting error by the counter 116 and/or counter 122.

Generating multiple bits of the encryption key from a single comparison between the first count value and the second count value may allow the encryption key to be generated in a shorter time period than in a key generation process that generates a single bit from each comparison between the first count value and the second count value. In some embodiments, the entire encryption key may be generated from a single comparison between the first count value and the second count value. In other embodiments, the first and second count values may be used to generate a plurality of bits for a first portion of the encryption key, and the key generation circuit 110 may generate one or more additional portions of the encryption key using other values for the first select signal and/or second select signal.

In various embodiments, the use of the STNOs to generate the encryption key may allow the encryption key to include an increased number of bits compared with prior PUF encryption keys (e.g., due to the small physical dimensions and three-dimensional integration of the MTJs of the STNOs). The increased number of bits may increase the strength of the encryption key. Furthermore, the key generation process may not interfere with the data stored by the STNOs 106a-d and/or 108a-d.

In various embodiments, the circuit 100 may provide the encryption key to an authenticating device (e.g., an authentication server) as part of an authentication process. The authentication process may use a challenge-response authentication process. The authenticating device may have one or more valid encryption keys associated with the circuit 100 stored on or accessible by the authenticating device. The encryption keys may be associated with a pre-defined sequence for the first and second select signals. The authenticating device may transmit a challenge message to the circuit 100 to request the encryption key. In some embodiments, the challenge message may include information to indicate the pre-defined sequence of the first and second select signals that are to be used to generate the encryption key. The circuit 100 may generate the encryption key and send the encryption key to the authenticating device. The authenticating device may compare the received encryption key with the corresponding valid encryption key to authenticate the circuit 100.

Figure 3:
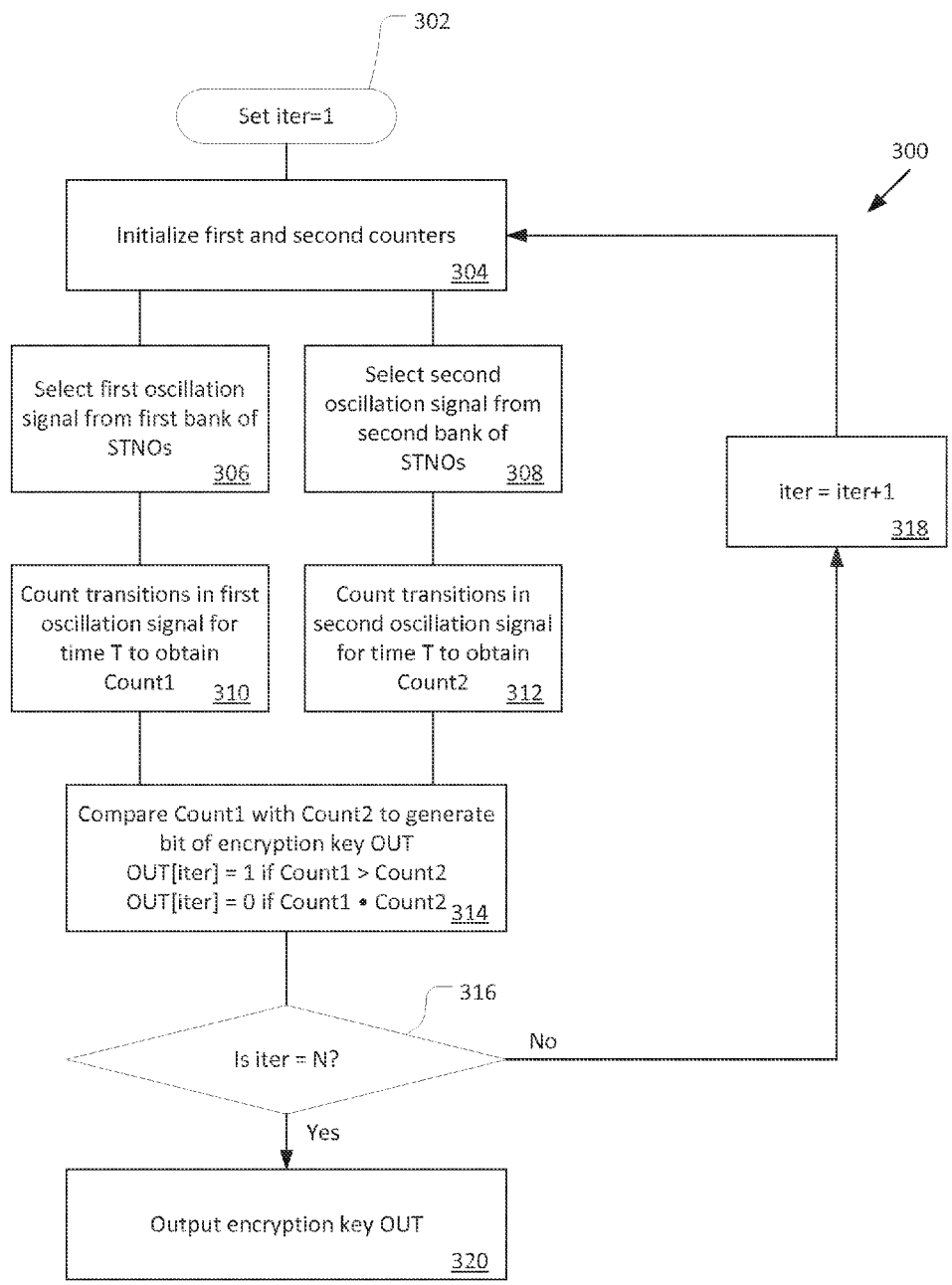
FIG. 3 illustrates an example method for generating an encryption key in accordance with various embodiments.

FIG. 3 illustrates a method 300 for generating an encryption key in accordance with various embodiments. The method 300 may be performed by an authentication circuit (e.g., circuit 100) and/or a key generation circuit (e.g., key generation circuit 110). In some embodiments, the authentication circuit may include one or more tangible storage media having instructions, stored thereon, that when executed cause an apparatus to perform one or more operations of the method 300.

At block 302 of the method 300, an iteration variable iter may be set to an initial value (e.g., 1). At block 304 of the method 300, the authentication circuit may initialize first and second counters (e.g., first counter 116 and second counter 122). For example, the first and second counters may be reset to values of 0.

At block 306 of the method 300, the authentication circuit may select a first oscillation signal from a plurality of oscillation signals associated with a first bank of STNOs (e.g., first bank 102). The first bank of STNOs may include a plurality of STNOs (e.g., STNOs 106a-d) that generate respective oscillation signals.

At block 308 of the method 300, the authentication circuit may select a second oscillation signal from a plurality of oscillation signals associated with a second bank of STNOs (e.g., second bank 104). The second bank of STNOs may include a plurality of STNOs (e.g., STNOs 108a-d) that generate respective oscillation signals.

At block 310 of the method 300, the authentication circuit may count transitions in the first oscillation signal for a time T to obtain a first count value Count1. The transitions of the first oscillation signal may be counted by the first counter. The transitions may include, for example, rising edges and/or falling edges of the first oscillation signal. Accordingly, Count1 may correspond to the frequency of the first oscillation signal.

At block 312 of the method 300, the authentication circuit may count transitions in the second oscillation signal for the time T to obtain a second count value Count2. The transitions of the second oscillation signal may be counted by the second counter. The transitions may include, for example, rising edges and/or falling edges of the second transition signal. Accordingly, Count2 may correspond to the frequency of the second transition signal.

At block 314 of the method 300, the authentication circuit may compare Count1 with Count2 to generate a bit of an encryption key. The bit may have a first value (e.g., a logic 1) if Count1 is greater than Count2, and may have a second value (e.g., a logic 0) if Count1 is less than or equal to Count2.

At block 316 of the method 300, the authentication circuit may determine if the iteration variable iter is equal to or greater than a value N that corresponds to a number of bits in the encryption key. If iter is less than N, then, at block 318 of the method 300, the authentication circuit may increment iter by one (e.g., iter=iter+1). The method 300 may then return to block 304 to generate another bit of the encryption key. For each successive iteration of block 306, the authentication circuit may select the first and second oscillation signals according to a pre-defined sequence. Accordingly, the authentication circuit may use different oscillation signals for the first and second oscillation signals in different iterations of the block 306.

Once N bits have been generated by the method 300, the method may proceed to block 320. At block 320, the authentication circuit may output the encryption key. The encryption key may be used to authenticate a device that includes the authentication circuit. For example, the encryption key may be used as part of a challenge-response authentication process.

In various embodiments, the method 300 may be used to generate an encryption key with a plurality of bits, wherein individual bits of the plurality of bits are generated using different oscillation signals from the first and second banks of STNOs. The value of the individual bits may depend on the relative frequencies of the selected oscillation signals. As discussed herein, the frequencies of the oscillation signals may vary among the STNOs based on manufacturing variation (e.g., variation in the thickness of the non-magnetic layer). The frequencies of the oscillation signals may have an exponential dependence on the thickness of the non-magnetic layer. Accordingly, the encryption key may be unique to the authentication circuit, and may provide a low false rejection rate and/or false acceptance rate for the authentication process.

Figure 4:
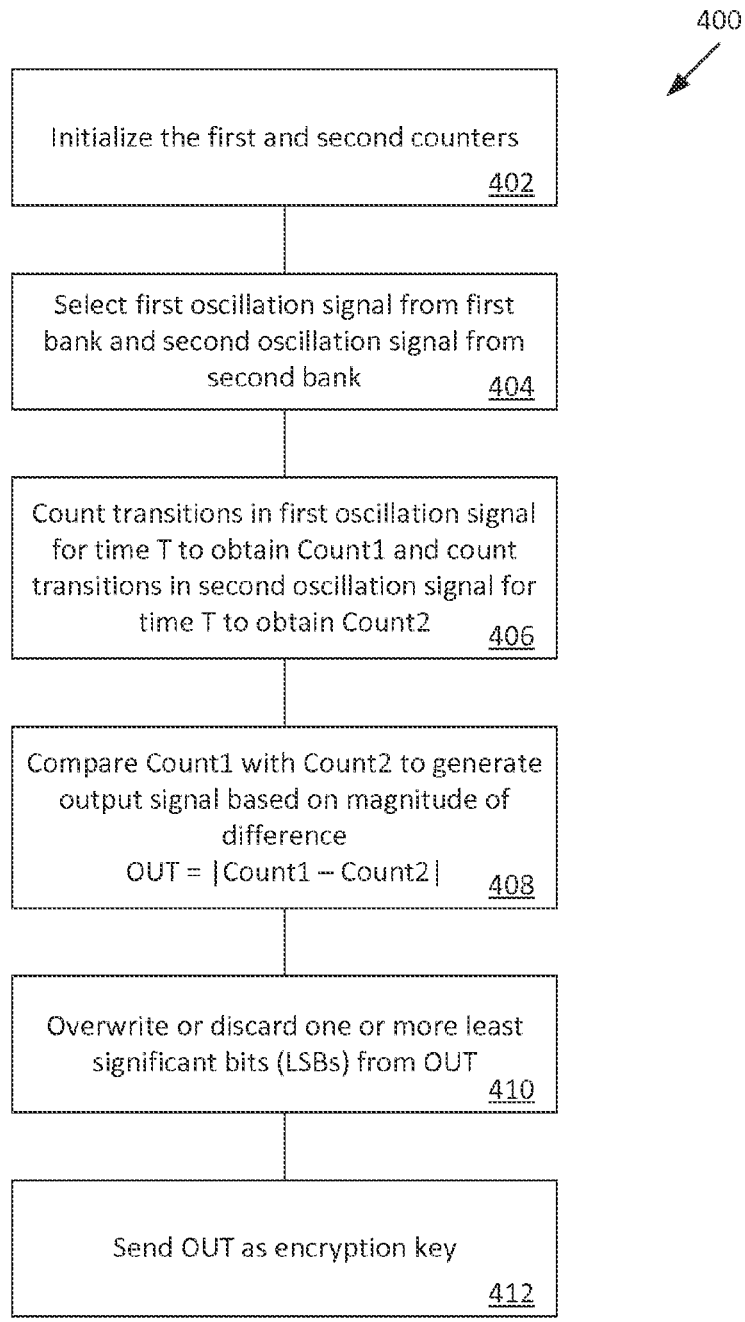
FIG. 4 illustrates another example method for generating an encryption key in accordance with various embodiments.

FIG. 4 illustrates another method for generating an encryption key in accordance with various embodiments. The method 400 may be performed by an authentication circuit (e.g., circuit 100) and/or a key generation circuit (e.g., key generation circuit 110). In some embodiments, the authentication circuit may include one or more tangible storage media having instructions, stored thereon, that when executed cause the authentication circuit to perform one or more operations of the method 400.

At block 402 of the method 400, the authentication circuit may initialize the first and second counters (e.g., first counter 116 and second counter 122). For example, the first and second counters may be reset to values of 0.

At block 404 of the method 400, the authentication circuit may select a first oscillation signal from a plurality of oscillation signals associated with a first bank of STNOs (e.g., first bank 102). The first bank of STNOs may include a plurality of STNOs (e.g., STNOs 106a-d) that generate respective oscillation signals.

At block 406 of the method 400, the authentication circuit may select a second oscillation signal from a plurality of oscillation signals associated with a second bank of STNOs (e.g., second bank 104). The second bank of STNOs may include a plurality of STNOs (e.g., STNOs 108a-d) that generate respective oscillation signals.

At block 408 of the method 400, the authentication circuit may count transitions in the first oscillation signal for a time T to obtain a first count value Count1. The transitions of the first oscillation signal may be counted by the first counter. The transitions may include, for example, rising edges and/or falling edges of the first oscillation signal. Accordingly, Count1 may correspond to the frequency of the first oscillation signal.

At block 410 of the method 400, the authentication circuit may count transitions in the second oscillation signal for the time T to obtain a second count value Count2. The transitions of the second oscillation signal may be counted by the second counter. The transitions may include, for example, rising edges and/or falling edges of the second transition signal. Accordingly, Count2 may correspond to the frequency of the second transition signal.

At block 414 of the method 400, the authentication circuit may compare Count1 with Count2 to generate an output signal (OUT) based on a magnitude of a difference between Count1 and Count2. For example, the output signal may have a plurality of bits that correspond to a value of |Count1−Count2| (e.g., OUT=|Count1−Count2|).

At 416 of the method 400, the authentication circuit may overwrite or discard one or more least significant bits (LSBs) from the output signal. Overwriting or discarding the one or more LSBs may account for noise in Count1 and/or Count2.

At block 418 of the method 400, the authentication circuit may output the modified output signal (e.g., with the one or more LSBs overwritten or removed) as the encryption key.

Accordingly, the method 400 may be used to generate a plurality of bits of the encryption key using the first and second oscillation signals. In some embodiments, method 400 may be performed multiple times to generate different portions of the encryption key. For example, a first iteration of the method 400 may generate a first portion of the encryption key, the first portion including a plurality of bits. Further iterations of the method 400 may be performed to generate additional portions of the encryption key.

Figure 5:
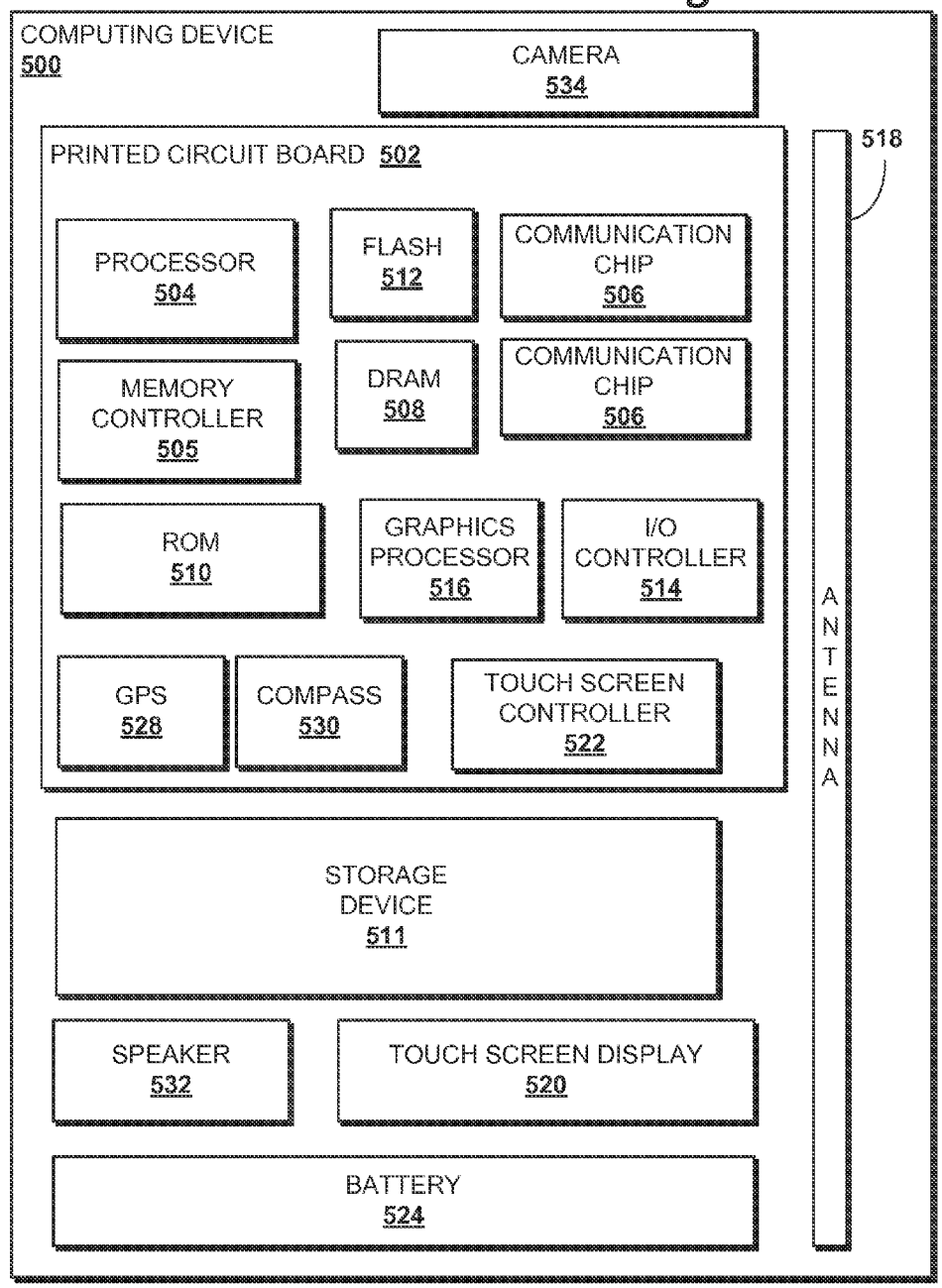
FIG. 5 illustrates an example system configured to employ the apparatuses and methods described herein, in accordance with various embodiments.

FIG. 5 illustrates an example computing device 500 that may employ the apparatuses and/or methods described herein (e.g., circuit 100, STNO 200, method 300, method 400), in accordance with various embodiments. As shown, computing device 500 may include a number of components, such as one or more processor(s) 504 (one shown) and at least one communication chip 506. In various embodiments, the one or more processor(s) 504 each may include one or more processor cores. In various embodiments, the at least one communication chip 506 may be physically and electrically coupled to the one or more processor(s) 504. In further implementations, the communication chip 506 may be part of the one or more processor(s) 504. In various embodiments, computing device 500 may include printed circuit board (PCB) 502. For these embodiments, the one or more processor(s) 504 and communication chip 506 may be disposed thereon. In alternate embodiments, the various components may be coupled without the employment of PCB 502.

Depending on its applications, computing device 500 may include other components that may or may not be physically and electrically coupled to the PCB 502. These other components include, but are not limited to, memory controller 505, volatile memory (e.g., dynamic random access memory (DRAM) 508), non-volatile memory such as read only memory (ROM) 510, flash memory 512, storage device 511 (e.g., a hard-disk drive (HDD)), an I/O controller 514, a digital signal processor (not shown), a crypto processor (not shown), a graphics processor 516, one or more antenna 518, a display (not shown), a touch screen display 520, a touch screen controller 522, a battery 524, an audio codec (not shown), a video codec (not shown), a global positioning system (GPS) device 528, a compass 530, an accelerometer (not shown), a gyroscope (not shown), a speaker 532, a camera 534, and a mass storage device (such as hard disk drive, a solid state drive, compact disk (CD), digital versatile disk (DVD)) (not shown), and so forth. In various embodiments, the processor 504 may be integrated on the same die with other components to form a System on Chip (SoC).

In some embodiments, the one or more processor(s) 504, flash memory 512, and/or storage device 511 may include associated firmware (not shown) storing programming instructions configured to enable computing device 500, in response to execution of the programming instructions by one or more processor(s) 504, to practice all or selected aspects of the methods described herein (e.g., method 300, method 400).

In various embodiments, these aspects may additionally or alternatively be implemented using hardware separate from the one or more processor(s) 504, flash memory 512, or storage device 511.

In various embodiments, one or more components of the computing device 500 may include the circuit 100, the first bank of STNOs 102, the second bank of STNOs 104, and/or the key generation circuit 110 described herein. For example, the circuit 100 and/or key generation circuit 110 may be included in processor 504, I/O controller 514, memory controller 505, and/or another component of computing device 500. In some embodiments, the DRAM 508, ROM 510, and/or storage device 511 may include the first bank of STNOs 102 and/or the second bank of STNOs 104. In some embodiments, the key generation circuit 110, first bank of STNOs 102, and second bank of STNOs 104 may be included with the processor 504 on an SoC.

The communication chips 506 may enable wired and/or wireless communications for the transfer of data to and from the computing device 500. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 506 may implement any of a number of wireless standards or protocols, including but not limited to IEEE 702.20, Long Term Evolution (LTE), LTE Advanced (LTE-A), General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Worldwide Interoperability for Microwave Access (WiMAX), Bluetooth, derivatives thereof, as well as any other wireless protocols that are designated as 3G, 4G, 5G, and beyond. The computing device 500 may include a plurality of communication chips 506. For instance, a first communication chip 506 may be dedicated to shorter range wireless communications such as Wi-Fi and Bluetooth, and a second communication chip 506 may be dedicated to longer range wireless communications such as GPS, EDGE, GPRS, CDMA, WiMAX, LTE, Ev-DO, and others.

In various implementations, the computing device 500 may be a laptop, a netbook, a notebook, an ultrabook, a smartphone, a computing tablet, a personal digital assistant (PDA), an ultra-mobile PC, a mobile phone, a desktop computer, a server, a printer, a scanner, a monitor, a set-top box, an entertainment control unit (e.g., a gaming console or automotive entertainment unit), a digital camera, an appliance, a portable music player, or a digital video recorder. In further implementations, the computing device 500 may be any other electronic device that processes data.

Various non-limiting Examples are provided below.

Example 1 is an apparatus for generating an encryption key, comprising: a first bank of spin-torque nano-oscillators (STNOs) including a plurality of STNOs to generate respective oscillation signals; a second bank of STNOs including a plurality of STNOs to generate respective oscillation signals; and a key generation circuit coupled to the first and second banks of STNOs. The key generation circuit to: select a first oscillation signal from the plurality of oscillation signals associated with the first bank of STNOs; select a second oscillation signal from the plurality of oscillation signals associated with the second bank of STNOs; and generate an encryption key based on a first frequency of the first oscillation signal and a second frequency of the second oscillation signal.

Example 2 is the apparatus of Example 1, wherein the key generation circuit includes: a first multiplexer coupled to the first bank of STNOs to select the first oscillation signal based on a first select signal; and a second multiplexer coupled to the second bank of STNOs to select the second oscilation signal based on a second select signal.

Example 3 is the apparatus of Example 2, wherein the key generation circuit further includes: a first counter coupled to the first multiplexer to count transitions in the first oscillation signal for a time period to obtain a first count value; a second counter coupled to the second multiplexer to count transitions in the second oscillation signal for the time period to obtain a second count value; and a comparator to compare the first and second count values, wherein the key generation circuit is to generate the encryption key based on the comparison.

Example 4 is the apparatus of Example 3, wherein the comparator is to compare the first and second values by being configured to determine a magnitude of a difference between the first and second count values, and wherein the encryption key includes a plurality of bits having values based on the magnitude of the difference between the first count value and the second count value.

Example 5 is the apparatus of Example 4, wherein the key generation circuit is to overwrite or discard one or more least significant bits of the determined magnitude for generation of the plurality of bits of the encryption key.

Example 6 is the apparatus of Example 1, wherein the key generation circuit is to generate a first portion of the encryption key based on the first frequency and the second frequency, and wherein the key generation circuit is further to: select a third oscillation signal from the plurality of oscillation signals associated with the first bank of STNOs; select a fourth oscillation signal from the plurality of oscillation signals associated with the second bank of STNOs; and generate a second portion of the encryption key based on a third frequency of the third oscillation signal and a fourth frequency of the fourth oscillation signal.

Example 7 is the apparatus of Example 6, wherein the first portion is a single bit having a first value if the first frequency is higher than the second frequency or a second value if the first frequency is lower than the second frequency.

Example 8 is the apparatus of Example 1, wherein the key generation circuit is to generate a first portion of the encryption key based on the first frequency and the second frequency, and wherein the key generation circuit is further to: generate a plurality of portions of the encryption key, including the first portion, based on a first pre-defined sequence of STNO indices corresponding to respective STNOs of the first bank of STNOs and a second pre-defined sequence of STNO indices corresponding to respective STNOs of the second bank of STNOs.

Example 9 is the apparatus of any one of Examples 1 to 8, wherein the key generation circuit is further to transmit the encryption key to an authentication server for authentication of the apparatus.

Example 10 is the apparatus of any one of Examples 1 to 8, wherein the plurality of STNOs of the first bank of STNOs and the plurality of STNOs of the second bank of STNOs are memory cells including respective magnetic tunnel junctions (MTJs) to store data.

Example 11 is a method for generating an encryption key, comprising: selecting, based on a first select signal, a first oscillation signal from a plurality of oscillation signals associated with respective spin-torque nano-oscillators (STNOs) of a first bank of STNOs; selecting, based on a second select signal, a second oscillation signal from a plurality of oscillation signals associated with respective STNOs of a second bank of STNOs; counting, for a time period, a number of transitions in the first oscillation signal to obtain a first count value; counting, for the time period, a number of transitions in the second oscillation signal to obtain a second count value; and generating an encryption key based on the first and second count values.

Example 12 is the method of Example 11, wherein the generating the encryption key based on the first and second count values includes generating a first portion of the encryption key based on the first and second count values, and wherein the method further comprises: generating a plurality of portions of the encryption key, including the first portion, using a pre-defined sequence of the first select signal and the second select signal.

Example 13 is the method of Example 12, wherein the first portion is a single bit having a first value if the first frequency is higher than the second frequency or a second value if the first frequency is lower than the second frequency.

Example 14 is the method of Example 12, wherein the first portion is a plurality of bits having values based on a magnitude of a difference between the first and second count values.

Example 15 is the method of Example 11, wherein generating the encryption key includes: determining a magnitude of a difference between the first count value and the second count value; and determining a plurality of bits of the encryption key based on the determined magnitude.

Example 16 is the method of Example 15, wherein the determining the plurality of bits of the encryption key includes overwriting or discarding one or more least significant bits of the determined magnitude.

Example 17 is a computing system, comprising: a display; a processor coupled to the display; and a memory coupled to the processor, the memory including: a first bank of STNOs having a plurality of STNOs to generate respective oscillation signals; and a second bank of STNOs having a plurality of STNOs to generate respective oscillation signals. The computing system further comprises a key generation circuit coupled to the memory to generate an encryption key based on the oscillation signals generated by the STNOs of the first and second banks of STNOs.

Example 18 is the system of Example 17, wherein the key generation circuit includes: a first multiplexer to select a first oscillation signal, based on a value of a first select signal, from the plurality of oscillation signals associated with the first bank of STNOs; a second multiplexer to select a second oscillation signal, based on a value of a second select signal, from the plurality of oscillation signals associated with the second bank of STNOs; a first counter to count transitions in the first oscillation signal for a pre-defined time period to obtain a first count value; a second counter to count transitions in the second oscillation signal for the pre-defined time period to obtain a second count value; and a processing circuit to generate at least a portion of an encryption key based on the first count value and the second count value.

Example 19 is the system of Example 18, wherein the processing circuit is to generate a single bit of the encryption key using the first and second count values, wherein the single bit has a first value if the first count value is greater than the second count value or a second value if the first count value is less than the second count value.

Example 20 is the system of Example 19, wherein the processing circuit is to generate additional bits of the encryption key with different values for the first and second select signals.

Example 21 is the system of Example 18, wherein the processing circuit is to generate a plurality of bits of the encryption key using the first and second count values.

Example 22 is the system of Example 21, wherein the processing circuit is to: generate an output signal having a plurality of bits corresponding to a magnitude of a difference between the first and second count values; and overwrite or discard one or more least significant bits of the output signal to generate the encryption key.

Example 23 is the system of any one of Examples 18 to 22, wherein the value of the first select signal and the value of the second select signal are pre-defined values associated with the encryption key.

Although certain embodiments have been illustrated and described herein for purposes of description, this application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second, or third) for identified elements are used to distinguish between the elements, and do not indicate or imply a required or limited number of such elements, nor do they indicate a particular position or order of such elements unless otherwise specifically stated.

What is claimed is:

1. An apparatus, comprising:
   a first bank of spin-torque nano-oscillators (STNOs) including a plurality of STNOs to generate respective oscillation signals;
   a second bank of STNOs including a plurality of STNOs to generate respective oscillation signals; and
   a key generation circuit coupled to the first and second banks of STNOs, the key generation circuit to:
     select a first oscillation signal from the plurality of oscillation signals associated with the first bank of STNOs;
     select a second oscillation signal from the plurality of oscillation signals associated with the second bank of STNOs; and
     generate an encryption key based on a first frequency of the first oscillation signal and a second frequency of the second oscillation signal.

2. The apparatus of claim 1, wherein the key generation circuit includes:
   a first multiplexer coupled to the first bank of STNOs to select the first oscillation signal based on a first select signal; and
   a second multiplexer coupled to the second bank of STNOs to select the second oscillation signal based on a second select signal.

3. The apparatus of claim 2, wherein the key generation circuit further includes:
   a first counter coupled to the first multiplexer to count transitions in the first oscillation signal for a time period to obtain a first count value;
   a second counter coupled to the second multiplexer to count transitions in the second oscillation signal for the time period to obtain a second count value; and a comparator to compare the first and second count values, wherein the key generation circuit is to generate the encryption key based on the comparison.

4. The apparatus of claim 3, wherein the comparator is to compare the first and second values by being configured to determine a magnitude of a difference between the first and second count values, and wherein the encryption key includes a plurality of bits having values based on the magnitude of the difference between the first count value and the second count value.

5. The apparatus of claim 4, wherein the key generation circuit is to overwrite or discard one or more least significant bits of the determined magnitude for generation of the plurality of bits of the encryption key.

6. The apparatus of claim 1, wherein the key generation circuit is to generate a first portion of the encryption key based on the first frequency and the second frequency, and wherein the key generation circuit is further to:
  select a third oscillation signal from the plurality of oscillation signals associated with the first bank of STNOs;
  select a fourth oscillation signal from the plurality of oscillation signals associated with the second bank of STNOs; and
  generate a second portion of the encryption key based on a third frequency of the third oscillation signal and a fourth frequency of the fourth oscillation signal.

7. The apparatus of claim 6, wherein the first portion is a single bit having a first value if the first frequency is higher than the second frequency or a second value if the first frequency is lower than the second frequency.

8. The apparatus of claim 1, wherein the key generation circuit is to generate a first portion of the encryption key based on the first frequency and the second frequency, and wherein the key generation circuit is further to:
  generate a plurality of portions of the encryption key, including the first portion, based on a first pre-defined sequence of STNO indices corresponding to respective STNOs of the first bank of STNOs and a second pre-defined sequence of STNO indices corresponding to respective STNOs of the second bank of STNOs.

9. The apparatus of claim 1, wherein the key generation circuit is further to transmit the encryption key to an authentication server for authentication of the apparatus.

10. The apparatus of claim 1, wherein the plurality of STNOs of the first bank of STNOs and the plurality of STNOs of the second bank of STNOs are memory cells including respective magnetic tunnel junctions (MTJs) to store data.

11. A method, comprising:
  selecting, based on a first select signal, a first oscillation signal from a plurality of oscillation signals associated with respective spin-torque nano-oscillators (STNOs) of a first bank of STNOs;
  selecting, based on a second select signal, a second oscillation signal from a plurality of oscillation signals associated with respective STNOs of a second bank of STNOs;
  counting, for a time period, a number of transitions in the first oscillation signal to obtain a first count value;
  counting, for the time period, a number of transitions in the second oscillation signal to obtain a second count value; and
  generating an encryption key based on the first and second count values.

12. The method of claim 11, wherein the generating the encryption key based on the first and second count values includes generating a first portion of the encryption key based on the first and second count values, and wherein the method further comprises:
  generating a plurality of portions of the encryption key, including the first portion, using a pre-defined sequence of the first select signal and the second select signal.

13. The method of claim 12, wherein the first portion is a single bit having a first value if the first count value is higher than the second count value or a second value if the first count value is lower than the second count value.

14. The method of claim 12, wherein the first portion is a plurality of bits having values based on a magnitude of a difference between the first and second count values.

15. The method of claim 11, wherein generating the encryption key includes:
  determining a magnitude of a difference between the first count value and the second count value; and
  determining a plurality of bits of the encryption key based on the determined magnitude.

16. The method of claim 15, wherein the determining the plurality of bits of the encryption key includes overwriting or discarding one or more least significant bits of the determined magnitude.

17. A system, comprising:
  a display;
  a processor coupled to the display;
  a memory coupled to the processor, the memory including:
    a first bank of STNOs having a plurality of STNOs to generate respective oscillation signals; and
    a second bank of STNOs having a plurality of STNOs to generate respective oscillation signals;
  a key generation circuit coupled to the memory to generate an encryption key based on the oscillation signals generated by the STNOs of the first and second banks of STNOs.

18. The system of claim 17, wherein the key generation circuit includes:
  a first multiplexer to select a first oscillation signal, based on a value of a first select signal, from the plurality of oscillation signals associated with the first bank of STNOs;
  a second multiplexer to select a second oscillation signal, based on a value of a second select signal, from the plurality of oscillation signals associated with the second bank of STNOs;
  a first counter to count transitions in the first oscillation signal for a pre-defined time period to obtain a first count value;
  a second counter to count transitions in the second oscillation signal for the pre-defined time period to obtain a second count value; and
  a processing circuit to generate at least a portion of an encryption key based on the first count value and the second count value.

19. The system of claim 18, wherein the processing circuit is to generate a single bit of the encryption key using the first and second count values, wherein the single bit has a first value if the first count value is greater than the second count value or a second value if the first count value is less than the second count value.

20. The system of claim 19, wherein the processing circuit is to generate additional bits of the encryption key with different values for the first and second select signals.

21. The system of claim 18, wherein the processing circuit is to generate a plurality of bits of the encryption key using the first and second count values.

22. The system of claim 21, wherein the processing circuit is to:
   generate an output signal having a plurality of bits corresponding to a magnitude of a difference between the first and second count values; and
   overwrite or discard one or more least significant bits of the output signal to generate the encryption key.

23. The system of claim 18, wherein the value of the first select signal and the value of the second select signal are pre-defined values associated with the encryption key.

* * * * *